(12) United States Patent
Orner et al.

(10) Patent No.: US 10,218,577 B2
(45) Date of Patent: Feb. 26, 2019

(54) SYSTEMS AND METHODS FOR MAPPING AND VISUALIZING A WIRELESS MESH NETWORK

(71) Applicant: SCHNEIDER ELECTRIC IT CORPORATION, West Kingston, RI (US)

(72) Inventors: Bret Alan Orner, Wellesley, MA (US); Gary R. Ware, Newton, MA (US); Adam M. Fiske, North Kingstown, RI (US); Tiegeng Ren, Wakefield, RI (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 104 days.

(21) Appl. No.: 14/587,631

(22) Filed: Dec. 31, 2014

(65) Prior Publication Data
US 2016/0191357 A1 Jun. 30, 2016

(51) Int. Cl.
*H04L 12/28* (2006.01)
*H04L 12/24* (2006.01)
*H04W 24/02* (2009.01)
*H04W 24/08* (2009.01)

(52) U.S. Cl.
CPC ............ *H04L 41/12* (2013.01); *H04W 24/02* (2013.01); *H04W 24/08* (2013.01); *H04L 41/22* (2013.01)

(58) Field of Classification Search
USPC ................ 370/217, 254, 328, 338, 351, 474
See application file for complete search history.

(56) References Cited

U.S. PATENT DOCUMENTS

| | | | |
|---|---|---|---|
| 5,483,631 A * | 1/1996 | Nagai | G06F 11/328 709/224 |
| 6,225,999 B1 | 5/2001 | Jain et al. | |
| 7,366,113 B1 | 4/2008 | Chandra et al. | |
| 7,394,756 B1 | 7/2008 | Cook | |
| 8,824,336 B2 | 9/2014 | Jing et al. | |
| 2005/0047420 A1 | 3/2005 | Tanabe et al. | |
| 2009/0003324 A1 | 1/2009 | Zhao et al. | |
| 2011/0210816 A1* | 9/2011 | Wang | H04L 63/0428 340/3.71 |
| 2016/0014015 A1* | 1/2016 | Mangin | H04L 45/22 370/218 |

FOREIGN PATENT DOCUMENTS

WO  WO 2014/156439 A1 * 10/2014  ........... H04L 12/703

OTHER PUBLICATIONS

Notification of Transmittal of the International Search Report and the Written Opinon of the International Searching Authority from corresponding PCT/US2015/068093 dated Mar. 4, 2016.
Extended European Search Report from corresponding European Application No. 15876273.2 dated May 29, 2018.

* cited by examiner

*Primary Examiner* — Phuongchau Ba Nguyen
(74) *Attorney, Agent, or Firm* — Lando & Anastasi, LLP

(57) ABSTRACT

According to at least one embodiment, a system for mapping a mesh network is provided. The system includes a memory and at least one processor coupled to the memory. The at least one processor is configured to receive at least one network data packet from at least one network device in the mesh network; build a map of the mesh network including a representation of the at least one network device using information contained in the at least one network data packet; and display the map on a user interface. In some embodiments, the at least one network includes a plurality of network devices.

12 Claims, 6 Drawing Sheets

SYSTEMS AND METHODS FOR MAPPING AND VISUALIZING A WIRELESS MESH NETWORK

BACKGROUND

Technical Field

The invention generally related to communication networks, and more specifically to detecting, monitoring, and updating wireless mesh networks.

Discussion

The topologies of modern networks are dynamic. These modern networks may be, for example, point-to-point networks, bus networks, wireless internet networks, wirelessly connected networks, and the like. Each member device in a network may communicate through a number of networking devices, such as routers, gateways, network bridges, switches, hubs, and repeaters. In some networks, paths between devices change when forwarding devices fail or become overloaded. The exact path and status between endpoint devices, as well as the strength of each connection, is not always known.

SUMMARY

In today's growing networked world, it is becoming harder to track devices communicating in a network. Currently, a wireless mesh network of sensors and network devices does not report its own structure. In many cases, networking devices may disconnect and reconnect via various forwarding devices depending on forwarding device utilization and connection status. Due to the constantly changing structure of a network, it is appreciated that there is a problem when it comes to developing, debugging, and generally maintaining a network, and being able to detect and display a network map may be helpful. Embodiments disclosed herein manifest an appreciation for the need to actively monitor, map, and report a network structure to include the entire network.

According to at least one embodiment, a system for mapping a mesh network is provided. The system includes a memory and at least one processor coupled to the memory. The at least one processor is configured to receive at least one network data packet from at least one network device in the mesh network; build a map of the mesh network including a representation of the at least one network device using information contained in the at least one network data packet; and display the map on a user interface. In some embodiments, the at least one network includes a plurality of network devices.

In the system, the at least one network device may be configured to create the at least one network data packet, the at least one network data packet storing information descriptive of connection strength of the at least one network device, and send the at least one network data packet to a coordinator. The at least one processor may be further configured to log the at least one network data packet; detect, by analyzing information contained in the at least one network data packet, a change in the mesh network; and issue an alert in response to the change. The at least one processor may be further configured to log the at least one network data packet; detect, by analyzing information contained in the at least one network data packet, a change in the mesh network; and request a reconfiguration of the mesh network. The at least one processor may be further configured to log the at least one network data packet; determine, by analyzing information contained in the at least one network data packet, that an overloaded router is in the mesh network; and redirect at least one end device from the overloaded router to at least one other router. The at least one processor may be further configured to display identifiers to differentiate between routers, coordinators, and end devices on the map. The at least one processor may be further configured to display a connection strength of the at least one network device. The at least one processor may be further configured to update the map periodically. The at least one processor may be further configured to update the map in response to input requesting an update. The at least one network data packet may include information descriptive of connection strength between the at least one network device and one or more network devices neighboring the at least one network device.

According to another embodiment, a system comprising at least one network device in a mesh network is provided. The at least one network device is configured to create at least one network data packet, the at least one network data packet containing a device identifier of the at least one network device and a connection strength of the at least one network device, and send the at least one network data packet to a coordinator.

In the system, the at least one network data packet may include information descriptive of connection strength between the at least one network device and one or more network devices neighboring the at least one network device. The at least one network data packet may include information descriptive of at least one of a MAC address, a short address, a parent MAC address, a parent short address, a device type, a device up time, a working memory, a packet loss, and a retry counter. The at least one network data packet may include information retrieved from the at least one network device and a parent device connected to the at least one network device.

The system may further comprise a coordinator configured to receive the at least one network data packet from the at least one network device; build a map of the mesh network using information contained in the at least one network data packet; and display the map in a user interface. The at least one network data packet may be unsolicited.

According to another embodiment, a method for mapping a mesh network is provided. The method includes acts of receiving, by a coordinator from at least one network device, at least one network data packet; building, by the coordinator, a map of the mesh network using information contained in the at least one network data packet, the map including a representation of the at least one network device; and displaying, by the coordinator, the map in a user interface.

The method may further comprise acts of logging the at least one network data packet; analyzing the information contained in the at least one network data packet; detecting a change in the mesh network; and issuing, on the user interface, an alert in response to the change in the mesh network. In the method, the act of receiving the at least one network data packet may include an act of receiving at least one network data packet including information descriptive of connection strength between the at least one network device and one or more network devices neighboring the at least one network device. The method may further comprise an act of displaying a connection strength of the at least one network device.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example or embodiment disclosed herein may be combined with any other example or embodiment. References to "an example," "an embodiment," "some examples," "some embodiments," "an alternate example," "various embodiments," "one example," "at least one embodiment," "this and other examples" or the like are not necessarily mutually exclusive and are intended to indicate that a particular feature, structure, or characteristic described in connection with the example or embodiment may be included in at least one example or embodiment. The appearances of such terms herein are not necessarily all referring to the same example or embodiment. Furthermore, in the event of inconsistent usages of terms between this document and documents incorporated herein by reference, the term usage in the incorporated references is supplementary to that of this document; for irreconcilable inconsistencies, the term usage in this document controls.

Further features and advantages as well as the structure and operation of various embodiments are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
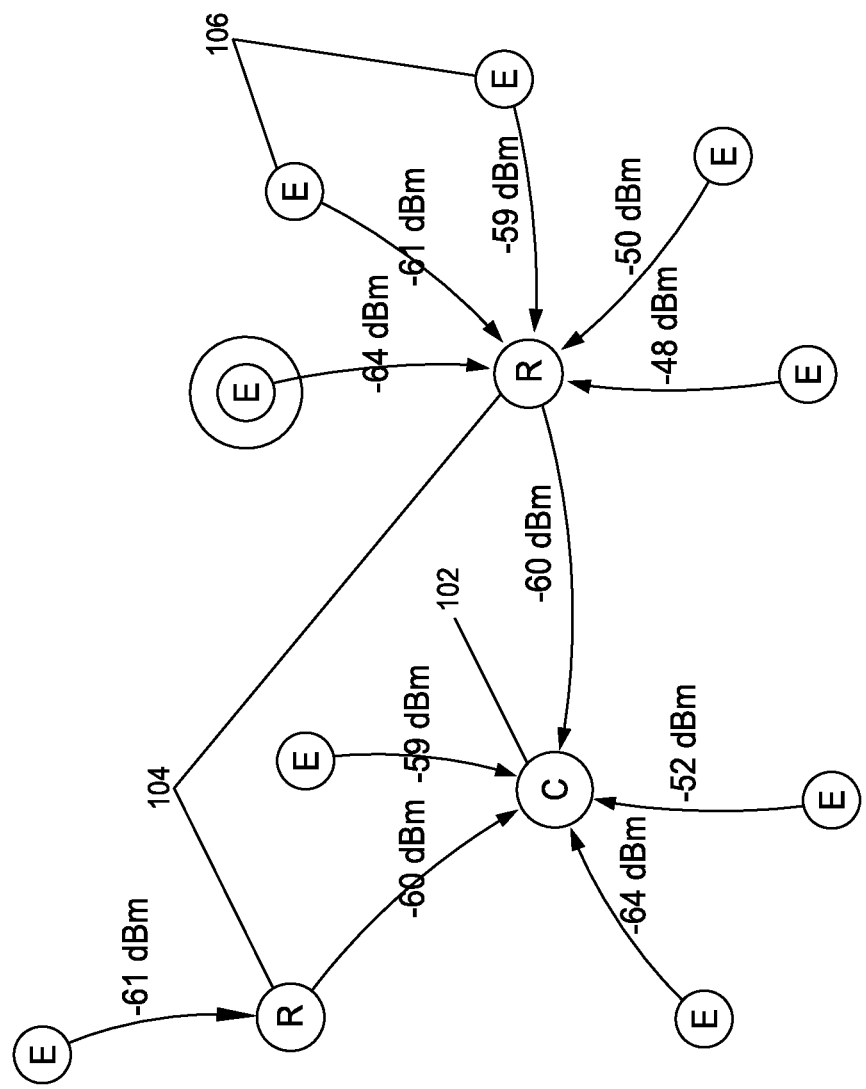
FIG. 1 is a block diagram of an example mapped mesh network, according to one embodiment.

Advances in technology have brought a proliferation of debugging tools that can be used to passively generate wireless network maps including all devices within the range of the tool. For example, Ubiqua from Ubilogix has the ability to passively discover network maps for all endpoint devices within range of a snooper. However, the visual depiction of the network may only contain the structure of the network without any additional information as to the status of each node and its relative health or connection strength. If a device is out of the snooper's range or if, for example, the end-to-end distance between two devices is greater than the range of the snooper, the network map displayed by the snooper may not include the entire network. Further, the network may be required to share network encryption credentials with the snooper.

Aspects and embodiments disclosed herein provide processes and apparatus by which a specially configured computing device monitors and maps communications between network devices. For instance, at least one embodiment implements a wireless network with devices that report their own statuses. Each device may, for example, send out a network data packet to a network coordinator, which is configured to compile the data packets from all of the devices into a map. The compiled data may then be displayed on a user interface along with information relating to each of the devices. This information may include device type, device ID, device address, memory usage, packet loss, connection strength, and parent/children devices. The data compiling and displaying processes described herein may be executed in real-time or near real-time by a coordinator, which connects directly to every endpoint device in a network or indirectly through one or more forwarding devices.

According to various aspects, the devices communicate over various protocols. In some embodiments, the coordinator may be configured to receive network data packets via a plurality of wireless protocols (e.g., Zigbee, 6LoWPAN, Z-Wave, WirelessHART, etc.). According to one aspect, network data packets may be compiled into a commonly readable format, such as, for example, a JSON object. Information may be communicated, for example, using standard Zigbee protocols. In some embodiments, the devices in the mesh network may implement the IEEE 802.15.4 standard or the IEEE 802.11s standard, each of which is hereby incorporated herein by reference in its entirety.

Another aspect relates to receiving the data over the network. The coordinator may be configured to receive information such as, for example, network data packets from all of the devices in the network periodically, in response to a communication failure, upon startup of a network device, or in response to a data packet query. The system may display one or more elements in the user interface (e.g., an "Update" button) to receive input requesting a rebuild and update of the network map.

According to another aspect, each device in a wireless mesh network is configured to periodically report a network data packet. An example format of a network data packet is described below in Table 1. A network data packet may include a command idea, a received signal strength indication, a link quality, a device type, a short address, a MAC address, memory usage, communication statistics (e.g., dropped packet rate and time-outs), device uptime, a MAC address of a parent, a short address of a parent, alternative parents along with the alternative parent's signal strengths, and a retry counter. In some examples, the end devices may also report characteristics related to neighboring devices, including connection strength (e.g., signal quality) between the end devices and any neighboring devices. A neighboring device may be a parent node or a child node in direct communication with a device. For example, a router connected directly to an end device may have the connection strength of the end device (e.g., via the received signal strength indication). In some examples neighboring devices may also include devices within range of each other. According to these examples, a network may be configured to avoid having end devices that are in range of only one router. Such a fault tolerant topology helps prevent orphaned devices resulting from failure of a single forwarding device because if the one router fails the end devices may become orphaned from the network.

Examples of the processes and apparatus described herein are not limited in application to the details of construction and the arrangement of components set forth in the following description or illustrated in the accompanying drawings. The processes and apparatus are capable of implementation in other examples and of being practiced or of being carried out in various ways. Examples of specific implementations are provided herein for illustrative purposes only and are not intended to be limiting. In particular, acts, components, elements and features discussed in connection with any one or more examples or embodiments are not intended to be excluded from a similar role in any other examples or embodiments.

Also, the phraseology and terminology used herein is for the purpose of description and should not be regarded as limiting. Any references to examples, embodiments, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Example Mesh Network Map

FIG. 1 shows an example mesh network including a coordinator 102, routers 104, and endpoints 106. A wireless mesh network is typically a communications network made up of radio nodes organized in a mesh topology. Wireless mesh networks may typically self form and self heal. The coordinator 102 may receive topological information from routers 104 and end devices 106. The received information may be in the form of network data packets and may include a set of data. One example of the data in a network data packet is described in Table 1. Both routers 104 and end devices 106 may collect and report information, but routers 104 may act as repeaters for the network, and allow the network to grow. Routers 104 are also always active, and may relay messages to or from an end device 106. End devices 106 may not be active, and in some examples may be powered off or sleeping.

According to some aspects, each of the devices (e.g., coordinators 102, routers 104, and end devices 106) may be a node in the mesh network. Each node in the network may directly communicate with any other node within its range. In some embodiments, the coordinator 102 may be configured to receive network data packets and compile the network data packets into a map that can be displayed on a user interface. One embodiment of a user interface in accord with these embodiments is described further below with reference to FIG. 3. According to various aspects, a router 104 can act as a repeater that can receive network data packets from areas that are not directly in the range of the coordinator 102 and transfer those network data packets to the coordinator 102 along with the router's network data packet. This way, the coordinator 102 can receive network data packets from every node connected in the mesh network, and not just the ones within direct range of the coordinator 102.

Figure 2:
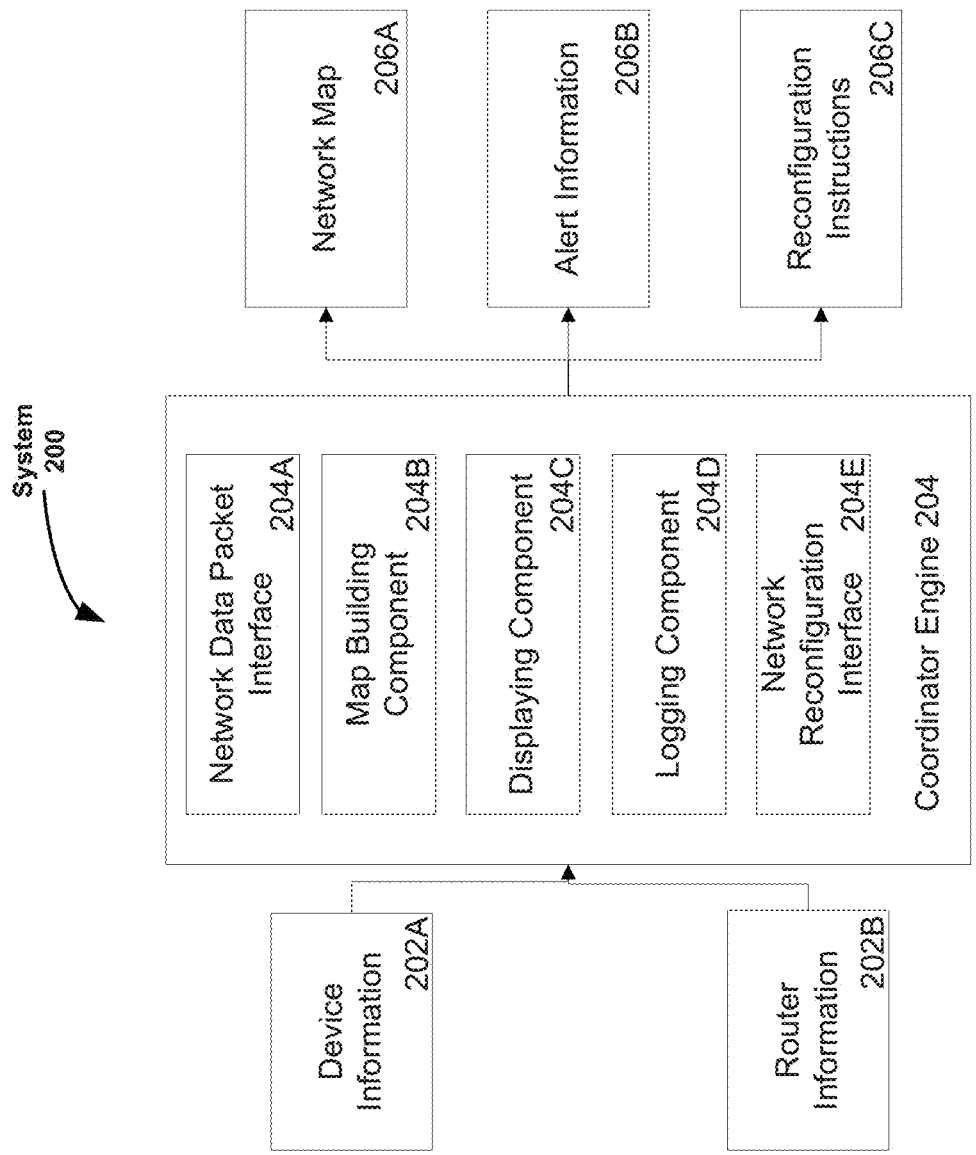
FIG. 2 is a block diagram of an example mesh network coordinator system, according to one embodiment.

FIG. 2 shows an example functional block diagram of a wireless mesh network coordinator system. The functional block diagram includes components and interfaces that may be executed on a computer system such as the example computer system 402 shown in FIG. 4. In one embodiment, each component and interface is executed as software by at least one processor. In other implementations, each component and interface may be an ASIC configured to execute the designated processes. System 200 includes a coordinator engine 204, which receives device information 202A from end devices and router information 202B from routers. Coordinator engine 204 has a network data packet interface 204A that receives the information, a map building component 204B that converts the information into a map, a displaying component 204C that displays the map on a display, a logging component 204D that logs and stores the information in, for example, a database, and a network reconfiguration interface 204E that sends information to request a reconfiguration of the network in response to a change in the network or an impending change in the network (e.g., an overloaded router, a missing or unresponsive network device, etc.). The coordinator engine 204 outputs a network map 206A and alert information 206B, which are displayed on a display, and reconfiguration instructions 206C.

According to some examples, the coordinator engine 204 receives device information 202 from end devices and router information 202B from routers. According to some aspects, the device information 202A and router information 202B are sent in the form of network data packets, which may be sent periodically, in response to a change in the network, or in response to a request generated from input received via a user interface. Transmission of network data packets may be unsolicited to, for example, conserve bandwidth.

According to various aspects, network data packet interface 204A is configured to accept network information (e.g., network data packets) received from end devices and routers and compile the network information into a commonly readable format (e.g., a JSON object). The network data packet interface 204A may also be configured to accept network data packets from authorized end devices and routers and automatically compile the network information. The map building component 204B then takes the compiled information, and uses it to build a map of all of the end devices and routers in the mesh network. The map may include connection strengths as well as details about all of the nodes including the type of device, device address, packet low rate, device uptime, memory usage, memory percentage, and packet retry counter.

According to one example, displaying component 204C is configured to display the map of coordinators, end devices, and routers on a user interface. In some embodiments, the user interface may receive input (e.g., via a touch screen or mouse) requesting display of information relating to any of the network devices or update of information at any time. According to some aspects, the display component 204C can display the network devices with visual indication (e.g., colors) that show device connection strength. For example, if an end device is at the edge of a mesh network and only connected to one router, that end device may be colored yellow, indicating that the end device is operating but is in danger of losing connection with the mesh network if the one router fails. In another example, an overloaded router that is connected to too many devices may be colored red to warn a user that data packets may soon be dropped. According to some aspects, devices that go missing may be displayed with, for example, a dotted line indicating they are disconnected. In these cases, a user interface may allow the missing devices to be erased from the map if, for example, the device movement is intentional.

In some examples, logging component 204D takes the compiled information from the network data packet interface 204A and puts the information into a data store (e.g., a log or a database). The logging component also tracks the information to see if any change is necessary. For example, if a router is overloaded or if a router has an increased packet drop rate, the logging component may discover the issue and notify the displaying component 204C and the network reconfiguration interface 204E.

In some embodiments, the logging component 204D may also store data descriptive of maps of devices to display various configurations created at different times. The logging component may be able to store configuration data from maps that were previously created, and compare them to current maps. In some examples, the logging component may create a network score that takes the information from the network and creates, for example, a percentage rating of how robust the network is. The network score may be based on the connection strength of each device in the network and the number of devices that are overloaded. The network score may be calculated to indicate a passing score (e.g., at least 60%) if no device is in danger of being disconnected from the network. The network score may change over time depending on the connection strengths of the network devices. The network score may be calculated, for example, by using a weighted average of the received signal strength indication, memory usage, and packet loss rate of all of the devices in the mesh network. A network may be deemed robust if no part of the network is overloaded, communication links are strong, and additional routers are not needed.

According to some aspects, the displaying component 204C may further be able to create a graph of data for each node over time. For example, the displaying component 204C may be able to display the peak usage times of each router. The displaying component 204C may also be able to display when the system has the least amount of traffic over a specified period of time. According to some aspects, the displaying component receives information to create the graphs from the logging component 204D.

Figure 3:
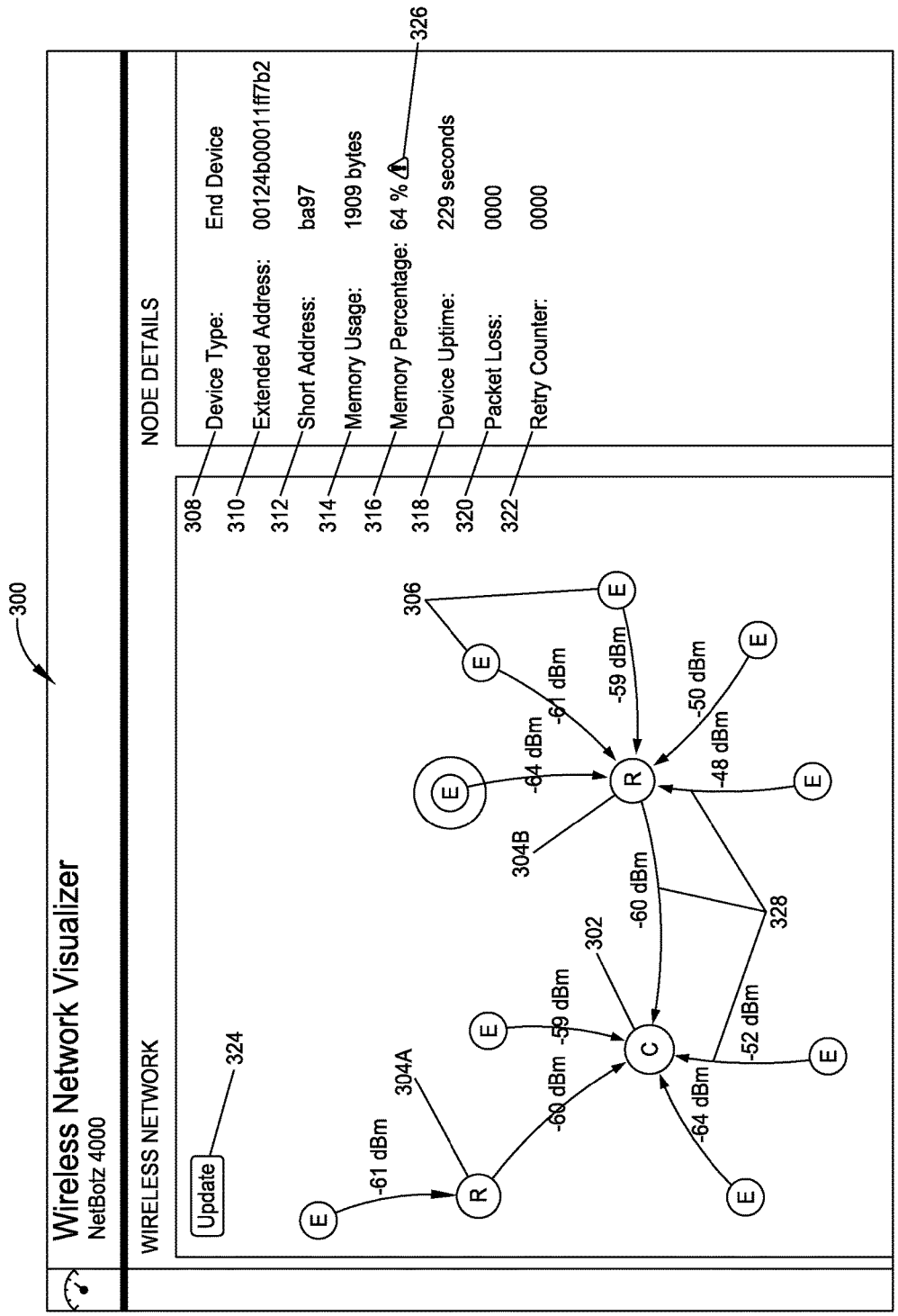
FIG. 3 is an illustration of an example user interface of the mesh network system, according to one embodiment.

According to some embodiments, the network reconfiguration interface 204E may be configured to generate an alert indicating a change in the network or a recommendation to prevent an upcoming problem. The network reconfiguration interface 204E may send the alert to the displaying component 204C to show the alert to the user. In one embodiment, the alert is displayed via a color of a device that is in danger of being disconnected (e.g., a red colored end device node to indicate an alert). The specific alert may be displayed when an input such as a click is received on the end device node. In other embodiments, the alert is displayed via an alert symbol or a popup on the user interface. For example, the alert symbol 326 of FIG. 3 shows an alert of a memory percentage that is higher than expected. According to another embodiment, if the logging component 204D detects a change in the network or an upcoming problem, the network reconfiguration interface 204E may automatically request a reconfiguration of the network. For example, if the logging component 204D detects an overloaded router, the reconfiguration component 204E may automatically request to redirect an end device from an overloaded router to a less loaded router. In some implementations, the reconfiguration component 204E may automatically redirect the end device from the overloaded router to the less loaded router.

According to one embodiment, a network coordinator may designate a router to become a new network coordinator in response to a failure. For example, every predetermined period of time, the network coordinator may search for a router with a high signal strength and low noise level to take over as the new network coordinator in response to the network coordinator failing. The network coordinator may check the strength of each router and generate maps of mesh networks using each router as a network coordinator. According to one example, the network coordinator may display the maps to a user to choose an alternate map in case of a network coordinator failure. According to another example, the network coordinator may automatically designate a router as the new network coordinator. The system may base the designation of a router as the new network coordinator on the associated mesh network map's network score. If a network coordinator fails, designated router may become the new network coordinator. Once designated, all of the devices on the network may be reconfigured to direct device network packets to the new network coordinator.

FIG. 3 shows an example of a visualized map 300 that is displayed on a user interface. In the map, end devices 306, routers 304, and the coordinator 302 are displayed as nodes. The map shows how end devices 306 are connected directly or indirectly through routers 304 to a coordinator 302. The connection arrows 328 may also have corresponding signal strengths, and all of the nodes 302, 304, and 306 may be color coded to indicate a level of connection strength. According to some aspects, each of the nodes may receive input, for example, from a touchpad or a mouse and in response display details about the node. In this example, some of the node details are shown on the right side of the page. The details include device name 308, extended address 310, short address 312, memory usage 316, memory percentage 318, packet loss 320, and retry counter 322. Other device information relating to the node as well as parent and children nodes may also be displayed.

According to various aspects, the coordinator 302 updates the map, including connection strengths and node details, automatically after a predetermined period of time. In some examples the coordinator 302 updates the node details more often or less often based on changes in activity or the robustness of the network. For example, the coordinator 302 may change the period of time between updates based on the network score. The coordinator 302 may also update the map in response to an input received at control 324. When a node is red to indicate, for example, that a router is overloaded, the system may be configured to present a recommendation for an action to fix the overloaded router before an error occurs. This can be done by adding a router, moving some end devices to another router, or replacing the overloaded router with a more powerful router. The recommendations may be displayed on the screen or sent via an email or text message. In one example, the system may be configured to send a message requesting, for example, an end device to switch routers. The system may be configured to solve an impending router failure by moving an end device from one router to another.

In some embodiments, the system can recommend a change by displaying various map configurations of devices in different locations to determine an ideal configuration. The system may determine or receive a connection range for each network device and calculate an ideal positioning of devices to make the network robust and also widespread. For example, in a scenario where the locations of the endpoint devices is not an issue, the system may recommend moving some of the end devices 306 from router 304B to router 304A to lighten the load on router 304B for continual operation.

According to some aspects, end devices 306 may be battery powered. According to these embodiments, each battery powered end device may include a battery charge in the network data packet. For example, if the battery in an end device is at lower than 20% charge, the data network packet may include an indication of the low battery and the coordinator 302 may generate and display a warning message indicating the low battery power of the end device.

According to one embodiment, the user interface may display a notification 326 on the screen to indicate an error or an alert. According to this embodiment, the system may be configured to log all of the data received. The logged data may be analyzed to detect changes in signal strength to issue the alert. The user interface may receive a selection at the notification 326. In response to the selection, more detailed information regarding a problem or impending error with the system may be displayed. According to some embodiments, a recommendation to fix the error may also be displayed. According to some aspects, the user interface may display the map including all of the node details as a webpage on a specially configured computer or a mobile application on a mobile device. The user interface may also include controls to zoom in and out as well as display the network information from different angles and sizes.

Computer System

As discussed above with regard to FIG. 1, FIG. 2, and FIG. 3, various aspects and functions described herein including the user interface may be implemented as specialized hardware or software components executing in one or more specialized computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 4:
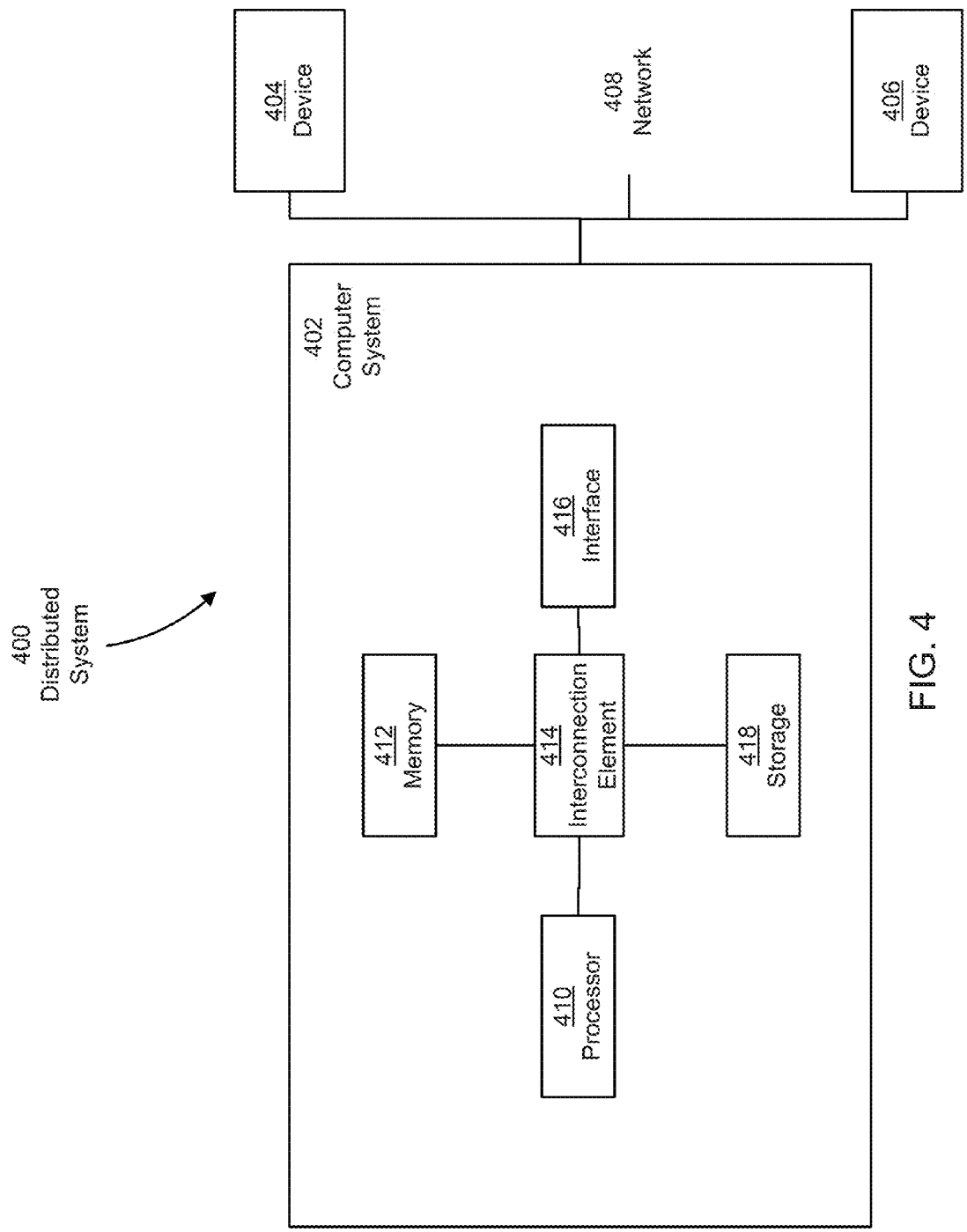
FIG. 4 is a block diagram of an example specially configured computer system, according to one embodiment.

Referring to FIG. 4, there is illustrated a block diagram of a distributed computer system 400, in which various aspects and functions are practiced. As shown, the distributed computer system 400 includes one or more computer systems that exchange information. More specifically, the distributed computer system 400 includes computer systems/devices 402, 404 and 406. As shown, the computer systems/devices 402, 404 and 406 are interconnected by, and may exchange data through, a communication network 408. The network 408 may include any communication network through which computer systems may exchange data. To exchange data using the network 408, the computer systems/devices 402, 404 and 406 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 402, 404 and 406 may transmit data via the network 408 using a variety of security measures including, for example, TLS, SSL or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, an interconnection element 414, an interface 416 and data storage element 418. To implement at least some of the aspects, functions and processes disclosed herein, the processor 410 performs a series of instructions that result in manipulated data. The processor 410 may be any type of processor, multiprocessor or controller. Some example processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 410 is connected to other system components, including one or more memory devices 412, by the interconnection element 414.

The memory 412 stores programs and data during operation of the computer system 402. Thus, the memory 412 may be a relatively high performance, volatile, random access memory such as a dynamic random access memory ("DRAM") or static memory ("SRAM"). However, the memory 412 may include any device for storing data, such as a disk drive or other nonvolatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the interconnection element 414. The interconnection element 414 may include one or more physical busses, for example, busses between components that are integrated within a same machine, but may include any communication coupling between system elements including specialized or standard computing bus technologies such as IDE, SCSI, PCI and InfiniBand. The interconnection element 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage element 418 includes a computer readable and writeable nonvolatile, or non-transitory, data storage medium in which instructions are stored that define a program or other object that is executed by the processor 410. The data storage element 418 also may include information that is recorded, on or in, the medium, and that is processed by the processor 410 during execution of the program. More specifically, the information may be stored in one or more data structures specifically configured to conserve storage space or increase data exchange performance. The instructions may be persistently stored as encoded signals, and the instructions may cause the processor 410 to perform any of the functions described herein. The medium may, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage element 418. The memory may be located in the data storage element 418 or in the memory 412, however, the processor 410 manipulates the data within the memory, and then copies the data to the storage medium associated with the data storage element 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having a different architectures or components than that shown in FIG. 4. For instance, the computer system 402 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Example Processes

As described above with reference to FIG. 1 and FIG. 3, several embodiments perform processes to generate and display a map of a mesh network. In some embodiments, these mapping processes are executed by a coordinator, such as coordinator 102 described above with reference to FIG. 1. The coordinator may implement software and hardware executing in one or more computer systems, such as the computer system 402 of FIG. 4.

Figure 5:
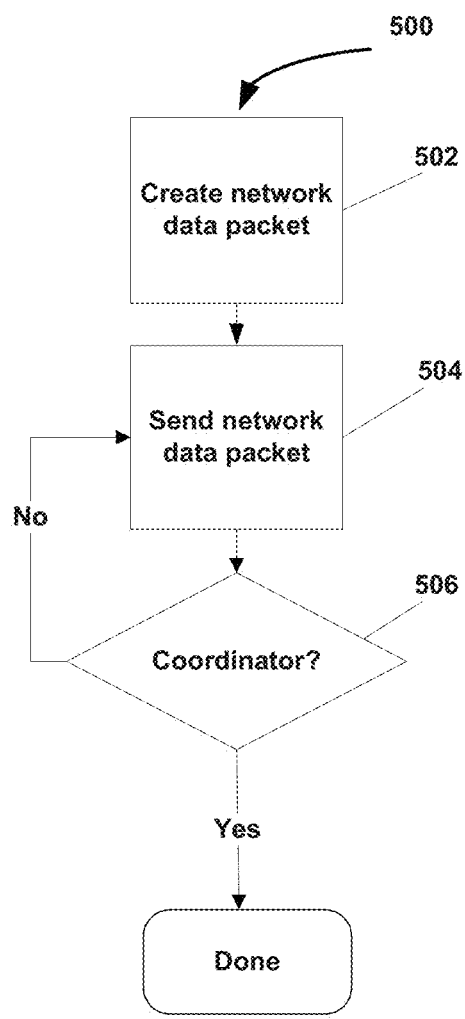
FIG. 5 shows a flow chart of a communication process for a router or end device to a network coordinator according to one embodiment.

FIG. 5 illustrates a process 500 of a device sending a network data packet to a coordinator to be compiled with other network data packets to create a map. Each device starts by creating the network data packet at act 502. According to some aspects, a data packet is created by combining and packaging multiple bytes of data. Table 1 depicts an example format of a network data packet created in act 502.

TABLE 1

| Field Name | Size (bytes) | Description |
| --- | --- | --- |
| Command ID | 1 | The Command ID |
| MAC Address | 8 | The MAC address of the device sending the report |
| Short Address | 2 | The network address assigned to the device |
| Parent MAC address | 8 | The MAC address of the device's parent |
| Parent Short Address | 2 | The network address assigned to the device's parent |
| RSSI | 8 | The Received Signal Strength Indication, as measured by the device |
| Device Type | 1 | Mode of the device (coordinator, router, end device) |
| Device Uptime | 1 | How long the device has been running since its last reset |
| Working Memory | 2 | The amount of dynamic memory currently being used |
| Packet loss | 2 | The number of packets which have been lost by the device |
| Retry Counter | 2 | Total number of packet retries by the device |

As seen in Table 1, in this example, the network data packet includes several fields: a command ID, a MAC address, a short address, a parent MAC address, a parent short address, a received signal strength indication (RSSI), a device type, a device uptime, a working memory, a packet loss count, and a retry counter. The command ID identifies a packet type of which the network data packet is an instance (i.e., a network data packet, as opposed to a sensor data packet or an acknowledgment packet). The short address is the network address assigned to the device. The RSSI may be an 8 byte section of the network data packet that indicates the strength of signals being received by the reporting device. According to some examples, the RSSI values can range from 0 decibels to −120 decibels, with 0 decibels being the strongest RSSI and −120 decibels being the weakest RSSI. More typical ranges may include −20 decibels, for a strong signal, to −100 decibels, for a weak signal. In other examples, the range may vary depending on the implementation. The device type may indicate whether the device is a coordinator, a router, or an end device. The device uptime indicates how long the device has been running. The working memory indicates the amount of memory being used. The working memory may be expressed as the percentage of overall memory being used. The packet loss indicates how many packets have been lost by the device due to, for example, communication problems. The retry counter indicates how many times the device has to try resending a packet due to, for example, a target device not receiving a packet. According to some embodiments, the information stored within a data packet is taken from a plurality of sources. For example, the parent MAC address may be determined by sending a ping to a parent device and receiving the parent MAC address. According to other embodiments, the network data packets are sent as individual bytes of data to a parent. The parent adds the parent MAC address and the parent short address along with the connection strength between the parent and the sending device before packaging the network data packet to be sent to the coordinator.

According to some examples, the end devices include counters or logs to store how many packets are lost and how many packet retries are sent. According to some aspects, each end device has a component that scans the end device to gather all of the information from the end device memory and adjacent devices. In some examples, each coordinator and router holds a table including each of the connected end devices and corresponding connection strengths.

At act 504, after all of the information has been compiled from various locations and packaged into a network data packet, the network data packet is sent to a parent. Network data packets may be sent wirelessly and without solicitation. The network data packet may be sent synchronously or asynchronously from all end devices, and may be sent through a plurality of routers. According to some embodiments, an end device may alternate between sending network data packets between a plurality of routers. For example, after a first period of time, an end device may send a network data packet to the coordinator via one router. Then after a second period of time, an end device may create and send an updated network data packet to the coordinator via a different router. According to other examples, the end device may directly send a network data packet to the coordinator without the need to go through a router. In various other examples, an end device may send a network data packet through a plurality of routers until it reaches the coordinator. The routers may be configured to forward network data packets towards the coordinator. According to one example, the coordinator is configured to send a receipt message after receiving a data packet. According to some examples, the coordinator only sends a receipt message when a new network device is added to the network. The coordinator may then add the new device to the map. According to other examples, the coordinator only receives network data packets and does not send any messages back.

According to some examples, routers may be configured to compile all of the network data packets into an aggregated network data packet that is subsequently sent to the coordinator. For example, if multiple routers receive, compile, and send network data packets and transfer the network data packets to one router that is closest to the coordinator, that one router may take all of the network data packets, decompile them into individual network data packets, and then recompile them all into one packet to be sent to the coordinator. These examples may be useful if the coordinator is configured to only receive one network data packet from each directly connected device. Each directly connected end device may send one network data packet and each router may send one aggregated network data packet including the information from other devices that are not directly connected to the coordinator.

According to other examples, each router sends or forwards each network data packet immediately without any separate packaging, which may consume fewer resources. Each discrete network data packet may be created, sent, and delivered individually, for example, within a certain time limit before the coordinator compiles them. Since, in these examples, each device individually sends a network data packet, devices may be connected directly to the coordinator without a router as an intermediary. Further, since all of the end devices are able to send the network data packets unsolicited, less bandwidth is used as the sending only has to go in one direction. According to some embodiments, however, data can be sent both ways if, for example, there is an input on the user interface requesting an update of the information. In these embodiments, the receiving network device may send an acknowledgement message back to the sending device to indicate a received network data packet. According to one implementation, intermediary receiving devices (e.g., routers) may not send an acknowledgement, but the coordinator may send an acknowledgement message to each end device that sends a network data packet. According to this implementation, if an end device does not receive an acknowledgement message from the coordinator within a predetermined period of time, the end device may create and resend a network data packet. The end device may also add to a retry counter. If the coordinator receives a retry counter that is above a threshold or if the coordinator does not receive a network data packet from an end device after a period of time, the coordinator may display a warning message indicating a potential communication problem with the end device.

At act 506, the network data packet has been sent and if the receiving device is not the coordinator, the process 500 goes back to act 504 and the receiving network device (e.g., a router) forwards the network data packet towards the coordinator. This loop goes on until the coordinator receives the network data packet. If the receiver is the coordinator, the end point device or router that sent the data is done until another period of time passes and the process 500 is re-executed. After the network data packets have reached the coordinator, process 500 ends.

Figure 6:
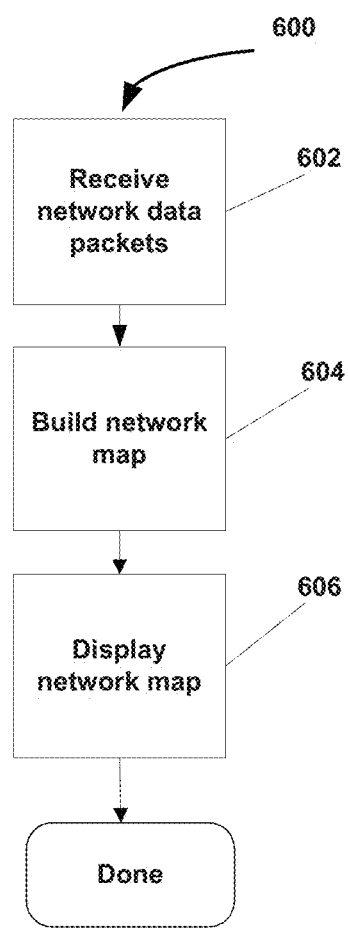
FIG. 6 shows a flow chart of a network mapping process for a coordinator according to one embodiment.

FIG. 6 illustrates a process 600 of a coordinator, such as coordinator 102 of FIG. 1 or coordinator engine 204 of FIG. 2, receiving network data packets, creating a map of the mesh network, and displaying the map of the mesh network in a user interface. At act 602, the coordinator receives network data packets from routers and end devices. The network data packets may be encoded in a common format. The coordinator may be configured to unpack and sort all of the information in the network data packets to analyze the information. According to some aspects, the coordinator may be configured to wait a period of time to receive all of the network data packets. There may be latency between creating and sending the network data packet from an end device to receiving the network data packet by the coordinator, so waiting a period of time may help allow the coordinator to receive all of the network data packets. For example, the network data packet interface 204A of FIG. 1 may begin to receive network data packets and the map building component 204B of FIG. 1 may be configured to wait a period of time before generating the network map.

In some examples, on receipt and unpacking of the network data packets, the coordinator may log all of the data into, for example, a database. The logged data may be queried from the database and displayed to a user or used to predict upcoming errors in the network. For example, if the logged data includes a trend with a rising memory usage of a router, the system may detect the rising memory usage before the router memory hits a critical point. The coordinator may track the logged memory usages from received network data packets to detect the rise. The system may further display a warning indicative of the rising memory usage to the user, for example, as a symbol next to the memory usage display on the user interface. According to one example, the system may automatically send a request to reduce the load on a router to avoid overloading the router. The request may be displayed as a recommendation on a user interface. In some examples, the request may be a request to disconnect from an end device. The router may be configured to, on receipt of the message, disconnect from the end device. The end device may be configured to automatically connect to another router, and as a result may connect to the next closest router. The end device may then be configured to prioritize the new router over the old one.

After all of the data is received and logged, at act 604, the system may build a network map using all of the information received. In some examples, the map is created and all of the nodes on the map include visual indications (e.g., color coded, highlighted, etc.) to illustrate each node's signal strength and load. For example, if a router is overloaded and if the router is the only router within the range of multiple end devices, the multiple end devices may be colored red to indicate that they are in danger of being disconnected from the network. All of the information for a device received and logged may also be represented as a part of the device's corresponding node on the map. In some examples the map may use other identifiers, such as bigger circles, for network devices that need more attention and are in danger of failing. In other examples, arrows may be used to indicate parent nodes and the direction the information is sent to the coordinator. The map may include the connection speed or status between the connected nodes as text near or over the arrows connecting the two nodes.

The coordinator may build the network map to include all of the devices in the network. At act 606, the system displays the map to a user via a user interface. The displayed map may include elements to display information relating to each individual device. The user interface may also include an input to send a request to update the map and all of the information within the map. According to one embodiment, the update request uses the latest received network data packets to update the map. According to another embodiment, the update request queries all of the devices to create and send an updated network data packet that is used by the coordinator to generate and update the displayed map. The map may be displayed with a warning for future device disconnections based on the memory usage of the routers and coordinator. If disconnected routers and end devices are known to exist in a previous log, according to some examples, the system may display the routers and end devices with a dotted line to indicate that the connection has been lost (e.g., due to the router failing). According to some embodiments, the user interface may be configured to receive input indicating that the devices were intentionally disconnected and remove the old devices from the displayed network map.

According to some aspects, the displayed map may include what type of end device is connected (e.g., a wireless humidity sensor, a wireless temperature sensor, a door switch sensor, etc.). The map may further include options to go back in time and view older versions of the map based on the log. In some examples, the map can also be customized to display a simpler or more complex view (e.g., by showing the routers with colors or circle sizes indicating the magnitude of their loads). For example, if a network is too big, and the user interface zooms out past a threshold, the map may consist of only routers and a coordinator. In this example, the size of the router node may be used to indicate how many devices are connected to the router and the color of the router node may be used to indicate how robust the end device connections to the router are (e.g., using the received signal strength indications of the end devices). The process 600 ends after the map is displayed.

The processes disclosed herein each include one particular sequence of acts in a particular example. The acts included in processes may be performed by, or using, one or more constrained computing devices specially configured as discussed herein. Some acts are optional and, as such, may be omitted in accord with one or more embodiments. Additionally, the order of acts can be altered, or other acts can be added, without departing from the scope of the systems and methods discussed herein. In addition, as discussed above, in at least one embodiment, the acts are performed on a particular, specially configured machine, namely a constrained computing device configured according to the examples disclosed herein.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the scope of the examples discussed herein. Accordingly, the foregoing description and drawings are by way of example only.

What is claimed is:

1. A system for mapping a mesh network, the system comprising:
   a memory; and
   at least one processor coupled to the memory and configured to:
   receive at least one network data packet from at least one network device in the mesh network, the at least one network data packet including information descriptive of a connection strength that includes a measured signal strength of a wireless received signal between the at least one network device and one or more other network devices in the mesh network;
   build a map of the mesh network including a representation of the at least one network device using the signal strength information contained in the at least one network data packet;
   display the map on a user interface, including a representation of the signal strength between the at least one network device and the one or more other network devices in the mesh network;
   log the at least one network data packet;
   detect, by analyzing information contained in the at least one network data packet, a change in the mesh network; and
   issue an alert in response to the change.

2. The system according to claim 1, further comprising the at least one network device configured to:
   create the at least one network data packet, the at least one network data packet storing information descriptive of connection strength of the at least one network device; and
   send the at least one network data packet to a coordinator.

3. The system according to claim 1, wherein the at least one processor is further configured to:
   request a reconfiguration of the mesh network.

4. The system according to claim 1, wherein the at least one processor is further configured to:
   determine, by analyzing information contained in the least one network data packet, that an overloaded router is in the mesh network; and
   redirect at least one end device from the overloaded router to at least one other router.

5. The system according to claim 1, wherein the at least one processor is further configured to display identifiers to differentiate between routers, coordinators, and end devices on the map.

6. The system according to claim 1, wherein the at least one processor is further configured to display the signal strength of the at least one network device.

7. The system according to claim 1, wherein the at least one processor is further configured to update the map periodically.

8. The system according to claim 1, wherein the at least one processor is further configured to update the map in response to input requesting an update.

9. The system according to claim 1, wherein the at least one network data packet includes information descriptive of connection strength between the at least one network device and one or more network devices neighboring the at least one network device.

10. A method for mapping a mesh network, the method comprising:
    receiving, by a coordinator from at least one network device, at least one network data packet including information descriptive of a connection strength that includes a measured signal strength of a wireless received signal between the at least one network device and one or more other network devices in the mesh network;
    building, by the coordinator, a map of the mesh network using the signal strength information contained in the at least one network data packet, the map including a representation of the at least one network device;
    displaying, by the coordinator, the map in a user interface, including a representation of the signal strength between the at least one network device and the one or more other network devices in the mesh network;
    logging the at least one network data packet;
    analyzing the information contained in the at least one network data packet; and
    detecting a change in the mesh network; and
    issuing, on the user interface, an alert in response to the change in the mesh network.

11. The method according to claim 10, wherein receiving the at least one network data packet includes receiving at least one network data packet including information descriptive of connection strength between the at least one network device and one or more network devices neighboring the at least one network device.

12. The method according to claim 10, further comprising displaying the signal strength of the at least one network device.

* * * * *